United States Patent
Griech et al.

(10) Patent No.: US 10,725,443 B2
(45) Date of Patent: Jul. 28, 2020

(54) RADIO MODULE FOR FIELD DEVICES OF AUTOMATION TECHNOLOGY

(75) Inventors: Reinhard Griech, Lörrach (DE); Christian Seiler, Auggen (DE); Thorsten Springmann, Schopfheim (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 1150 days.

(21) Appl. No.: 11/587,145

(22) PCT Filed: Mar. 23, 2005

(86) PCT No.: PCT/EP2005/051347
§ 371 (c)(1),
(2), (4) Date: Aug. 20, 2007

(87) PCT Pub. No.: WO2005/103851
PCT Pub. Date: Nov. 3, 2005

(65) Prior Publication Data
US 2008/0211664 A1    Sep. 4, 2008

(30) Foreign Application Priority Data
Apr. 23, 2004 (DE) .......... 10 2004 020 393

(51) Int. Cl.
*H04W 88/00* (2009.01)
*H04W 92/00* (2009.01)
*H04W 84/18* (2009.01)
*G05B 19/042* (2006.01)

(52) U.S. Cl.
CPC .. *G05B 19/042* (2013.01); *G05B 2219/25187* (2013.01); *G05B 2219/25289* (2013.01); *G05B 2219/25428* (2013.01); *H04W 84/18* (2013.01)

(58) Field of Classification Search
USPC ....................................... 340/539.1
See application file for complete search history.

(56) References Cited

U.S. PATENT DOCUMENTS

| | | | | |
|---|---|---|---|---|
| 5,790,040 A | * | 8/1998 | Kreier | G01J 1/04 250/222.1 |
| 5,854,994 A | * | 12/1998 | Canada | G01H 1/003 702/56 |
| 6,160,483 A | | 12/2000 | Radwan | |
| 6,532,370 B1 | | 3/2003 | Underbrink | |
| 6,686,831 B2 | * | 2/2004 | Cook | G05B 19/0423 307/31 |

(Continued)

FOREIGN PATENT DOCUMENTS

| | | |
|---|---|---|
| DE | 297 17 504 U1 | 1/1998 |
| DE | 298 05 605 U1 | 8/1998 |

(Continued)

*Primary Examiner* — John F Mortell
(74) *Attorney, Agent, or Firm* — Bacon & Thomas, PLLC

(57) ABSTRACT

A radio module RM for field devices of automation technology is connectable with a field device, e.g. F1, via a field device interface. The radio module RM includes a microcontroller μC for function control, a radio unit RF for data communication with a superordinated unit, and an energy supply unit ESU. With the help of the radio module RM, conventional field devices can be adapted simply to become radio-capable field devices, in order that they can then also be used in radio networks.

18 Claims, 2 Drawing Sheets

(56) References Cited

U.S. PATENT DOCUMENTS

| | | | | |
|---|---|---|---|---|
| 7,027,773 B1* | 4/2006 | McMillin | ............... | H04L 45/00 |
| | | | | 455/41.2 |
| 7,460,865 B2* | 12/2008 | Nixon | .................. | H04W 76/14 |
| | | | | 455/428 |
| 2002/0015417 A1* | 2/2002 | Asahina | ................. | H04W 4/18 |
| | | | | 370/466 |
| 2002/0054578 A1* | 5/2002 | Zhang | .................. | H04L 1/0001 |
| | | | | 370/328 |
| 2002/0183939 A1 | 12/2002 | Babel | | |
| 2003/0013412 A1 | 1/2003 | Kardach | | |
| 2003/0171827 A1 | 9/2003 | Keyes | | |
| 2005/0099289 A1* | 5/2005 | Arita | ..................... | G08B 25/10 |
| | | | | 340/539.1 |

FOREIGN PATENT DOCUMENTS

| | | |
|---|---|---|
| DE | 198 17 436 A1 | 10/1999 |
| DE | 198 26 513 A1 | 12/1999 |
| DE | 198 29 254 A1 | 1/2000 |
| DE | 200 13 806 U1 | 12/2000 |
| DE | 101 16 361 A1 | 10/2002 |
| EP | 1 293 853 A1 | 3/2003 |
| EP | 1 335 190 A2 | 8/2003 |
| RU | 2 159 019 C2 | 11/2000 |
| RU | 2 216 463 C1 | 11/2003 |
| WO | WO 01/01366 A2 | 1/2001 |
| WO | WO 02/086639 A1 | 10/2002 |
| WO | WO 2004/047043 A1 | 6/2004 |

\* cited by examiner

for registering measured values, e.g. pressure, temperature or flow, e.g. flow rate, at process components. As a rule, the measured values are forwarded to superordinated units, e.g. control units or systems, where they can be further processed or displayed.

RADIO MODULE FOR FIELD DEVICES OF AUTOMATION TECHNOLOGY

FIELD OF THE INVENTION

The invention relates to a radio module for field devices of automation technology.

BACKGROUND OF THE INVENTION

Field devices are widely applied in automation technology for registering measured values, e.g. pressure, temperature or flow, e.g. flow rate, at process components. As a rule, the measured values are forwarded to superordinated units, e.g. control units or systems, where they can be further processed or displayed.

Besides a data transmission from the field device to a receiver, also a data transmission to the field device is necessary, e.g. for the setting of configuration or parametering data. Via correspondingly selected parameters (units of measurement, limit values, etc.), field devices can, thus, be adapted to the particular measurement task.

Data transmission between field devices and superordinated units occurs, mostly, via fieldbus systems (Hart, Profibus or Foundation Fieldbus) with corresponding cable connections. If the energy (or power) supply occurs via the fieldbus, then one speaks of bus-fed, or 2-wire devices. If, besides the fieldbus, an additional connecting line is necessary for the energy supply, then one speaks of 4-wire devices.

For some time, also cable-less networks, so-called radio networks, have become known for sensors. Such a radio network is described in more detail in U.S. Pat. No. 6,208,247.

In the case of the sensors of this radio network, however, only a data transmission in one direction is possible, and, indeed, from the sensor to the superordinated unit. I.e., only the pure, measured values can be transmitted to the superordinated unit. This excludes the possibility of configuring or parametering field devices from the control system. Radio networks are suited especially for those industrial applications where no cabling is desired, or where cabling is only possible at great expense.

Radio networks for sensors are already specified in some detail in the standard, IEEE 802.15.4. An industry consortium, the ZigBee Alliance, is now developing application profiles, network- and security-standards for various areas of application using this new technology.

Developing sensors (field devices) for radio networks is very complex and expensive.

SUMMARY OF THE INVENTION

An object of the invention is to provide a radio module for field devices, which radio module is simple and cost-effective and which permits the use of conventional field devices in radio networks.

This object is achieved by a radio module connectable with a field device via field device interface. The radio module includes a microcontroller for function control, a radio unit for data communication with a superordinate unit and an energy supply unit.

An essential idea of the invention is to expand a conventional field device using a radio module, which, on the one hand, serves for data communication with a superordinated unit, and, on the other hand, also cares for the energy supply of the field device. To this end, the radio module includes, besides a radio unit, also a microcontroller, which is connectable with the field device via a field device interface and a data connection line. For energy supply of the field device, the radio module includes an energy supply unit, which supplies the field device with electrical voltage via a corresponding connection.

Using such a radio module, it is possible, in principle, to augment any conventional field device simply, in order to install it in a radio network. Besides the transmission of measured values to a receiver unit, also possible with the help of the radio module is a transmission of parameter values to the field device. Since the field device is supplied with energy solely by way of the radio module, it is possible, in principle, to install a field device equipped with a radio module at any location. For the energy supply, various alternatives are available, such as batteries, solar cells or fuel cells. However, other options include installations with wire-based energy supply.

Especially because the storage capacity of batteries is limited, it is desirable that field device and radio module together consume as little energy as possible. Therefore, an energy control unit is provided in the radio module.

Additionally, a system clock (real-time clock RTC) is provided in the radio module.

In terms of radio transmission methods, the FHSS and DSSS methods are especially suitable. Special advantages are offered by the UWB method. All of these radio transmission methods are directed toward small energy consumption.

Data communication of the individual field devices with one another preferably occurs using the known mesh-technology.

BRIEF DESCRIPTION OF THE DRAWINGS

The invention will now be explained in greater detail on the basis of an example of an embodiment illustrated in the drawing, the figures of which show as follows.

DESCRIPTION OF THE PREFERRED EMBODIMENTS

Figure 1:
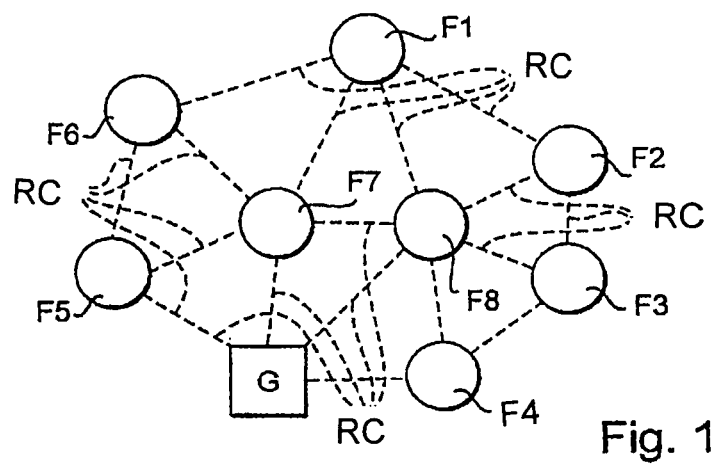
FIG. 1. a first radio network with a plurality of field devices.

FIG. 1 shows a first radio network having a plurality of field devices F1, F2, F3, F4 . . . The respective radio connections RC with one another and with a gateway G are shown as dashed lines. The gateway G can be a remote transmission unit (e.g. "Fieldgate" product of the firm Endress+Hauser), which communicates by radio connection with the individual field devices. With the help of the remote transmission unit G, in principle, a worldwide communication is possible, for example, via Internet, GSM, or fixed network, to a superordinated unit. In this way, the measured values of the individual field devices can be transmitted worldwide to any location and, there, evaluated.

The illustrated field devices can be, for example, fill level measuring devices, which are installed at storage vessels for crude oil or grain. The fill levels of these storage vessels can, thus, be monitored and controlled remotely.

As can be seen in FIG. 1, the field devices are connected together via various radio connection paths. This means, in the case of a malfunctioning of a particular radio connection RC, that the data communication can be maintained via alternate radio connection paths. When impediments (e.g. metal tanks) prevent a direct connection to the nearest field device, the data communication can occur via another radio connection.

Figure 2:
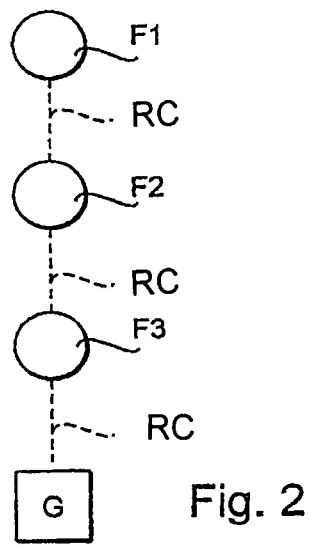
FIG. 2. a second radio network with a plurality of field devices.

FIG. 2 shows a second radio network with a plurality of field devices F1, F2, F3 and a gateway G. The reach of the radio network is increased by the measure that the individual field devices F2, F3 serve as intermediate stations. Each of the field devices is connected via two radio connection paths, or one radio connection path, RC, to its nearest neighbors, or neighbor. The field devices F2 and/or F3 assume, here, the function of a repeater. In this way, the reach of the radio network can be increased even in the case of small transmitting powers of the individual transmitters (field devices).

Suited as radio transmission technologies for the radio connections are, in the case of field devices, broadband technologies, such as, for example, Frequency Hopping Spread Spectrum (FHSS) or Direct Sequence Spread Spectrum (DSSS) methods. An alternative method is the Ultra Wide Band (UWB) technology. This radio transmission method requires only very small transmission powers, which is a great advantage in the case of field devices, since the power available is, as a rule, limited.

The required receiver/transmitter hardware is favorable in cost and easily installable, due to the fact that such systems are already in use in other technologies.

Complicated new developments are not required therefor.

In the case of the UWB method, the transmitter emits very short transmission pulses, which cover a very large range of several GHz of the frequency spectrum. The information is transmitted in these very short, extremely broadband pulses. Distortions or absorptions of individual frequency ranges have no decisive influence on the quality of transmission, since even in the case of smaller interferences, still sufficiently large frequency ranges arrive at the receiver undisturbed. As already mentioned, this technology permits the use of transmitter and receiver units which are very price-favorable, since no hardware is needed for limiting the receiving and transmitting range to fixed, narrow, frequency ranges. Because of the low transmission power, operation of such a network is possible without a radio license. In the case of the other transmission methods, as a rule, a radio license is needed for the utilized frequency band.

A further advantage offered by this type of radio transmission is the possible centimeter-accurate locating of the individual field devices using the travel-time measuring principle, such as can be used in the case of radar measurements. Thus, field devices can be very accurately located in plants. This is e.g. of importance, when plant plans are inaccurate and certain field devices need to be found.

Figure 3:
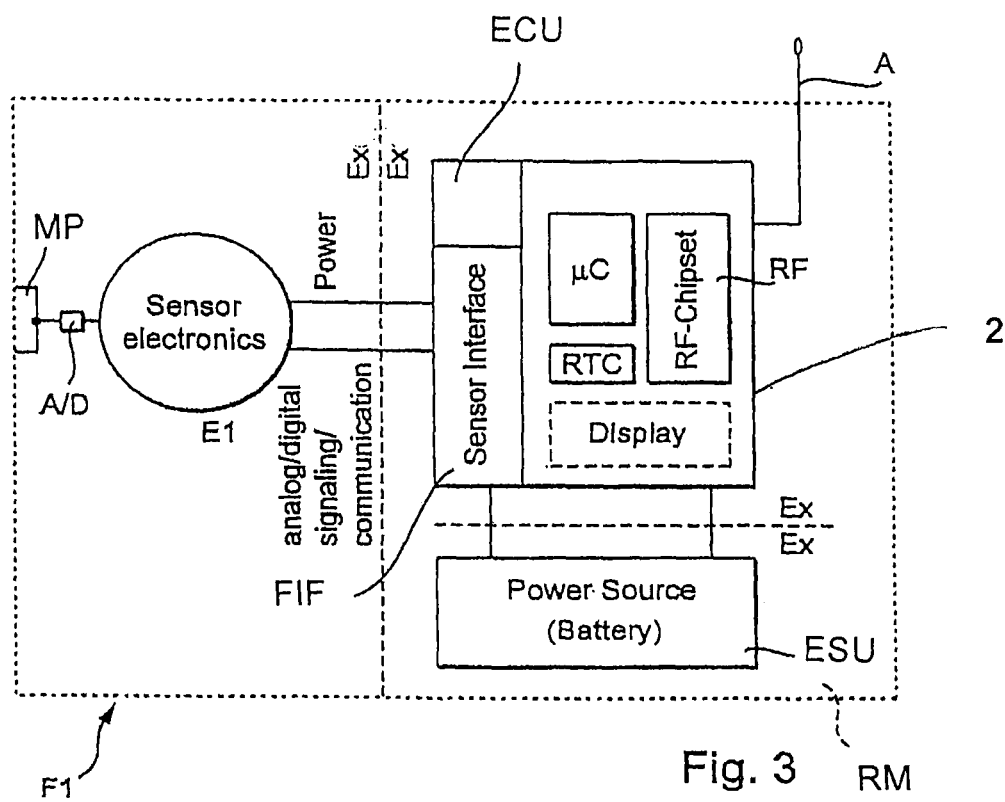
FIG. 3. presented as a block diagram, a field device with radio module.

FIG. 3 shows, presented in the form of a block diagram, a field device with radio module, for instance the field device F1 of FIG. 1. The radio module RM can also be releasably connected with the field device F1. The radio module RM includes a microcontroller $\mu C$, a radio unit RF composed of an RF-chipset, an energy supply unit ESU, and an antenna A. The radio module RM is connected via a field device interface FIF with the sensor electronics E1 of the actual field device F1. In the illustrated case, two connecting lines are provided for the connection with the sensor electronics E1 of the field device F1. Over these two lines occur both the data communication and also the energy supply of the field device. For the sake of overviewability, only the sensor electronics E1, a measurement pickup, or transducer, MP, and an analog-digital converter A/D of the actual field device F1 are shown.

Additionally, the radio module RM includes an energy control unit ECU. The energy supply unit ESU can be a battery or a fuel cell. As evident from the drawing, an Ex-barrier is provided between the energy supply unit ESU and the actual radio module 2. This Ex-barrier enables that the energy supply unit ESU can be simply exchanged, even in explosion-endangered areas.

Such an Ex-barrier is also provided between the field device F1 and the radio module RM. In this way, the radio module RM, when embodied as a separate unit, can be connected with a field device also in an explosion-endangered area.

The radio module RM can alternatively also be integrated as a unit fixedly in the housing of the field device F1. It can, however, also, as above mentioned, be embodied as a separate unit, which is connected releasably with the field device F1.

Such a modular construction has an essential advantage that also existing field devices can easily be adapted for such radio technologies. This is true especially for field devices having a typical field device interface (e.g. 4-20 mA, HART, Profibus, or Foundation Fieldbus). It is, however, also an option, to operate, using the radio module, field devices having digital switch outputs, such as e.g. limit switches.

Especially field devices working according to the HART standard are, due to the low transmission rate, especially well suited for use in radio networks. The field device interface FIF is, in the present example of an embodiment, adapted to the HART-protocol. Measured value information and status information can then be transmitted simply, in the form of HART-protocols, from the sensor electronics E1 to the radio module RM. Configuration data can also be transmitted from a superordinated unit per radio via radio module to the sensor electronics E1 in the field device F1. In this, certain timing requirements must, however, be obeyed. Via the radio module RM, the protocols are forwarded transparently.

A radio module RM without field device functionality can be applied as a simple repeater. Such a radio module serves then only for transmission of data between individual field devices.

Since usual energy supply units (batteries, fuel cells) have a finite life and field devices continuously consume energy during operation, an effective energy management is necessary. This energy management is performed by the energy control unit ECU. Only when functions of the field device F1 or the radio module are needed, is the appropriate unit set into full operational readiness.

The radio module RM can be operated in three different modes, which differ in their energy consumption. The individual modes can also be simultaneously active, or combined with one another, as the case may be.

Polling Mode:

The field device F1 is usually in a sleep state. If data for the field device F1 are received by the radio module RM, a corresponding signal is transmitted to the field device F1, which ends the sleep state and enables a data communication between radio module and field device F1. Each radio module listens during defined time intervals for data for the connected field device.

Scheduled Transmission Mode:

Field device F1 and radio module RM are only activated at certain times. During this active time, measured values can be registered and data transferred. In the remaining time, both are in a sleep state and, therefore, consume only very little energy. For this, the real-time clock RTC is needed in the radio module RM. The real-time clock provides the base time for the time control. In the active times, measured values, and status information regarding field device, radio module or energy supply unit, can be transmitted.

Also periodic signals, indicating that the radio unit is working correctly, can be transmitted during the active times. For this purpose, a heart-beat function is implemented in the radio module.

Event Mode:

In this mode, the data from the field device F1 are stored temporarily in the radio module RM and transmitted at certain time intervals to the superordinated unit. If certain status reports occur, the radio module is then activated, and the data are transmitted. The handling of limit value transgressions or measured value changes is similar.

Logging Mode

The radio module RM possesses optionally the ability to record measurement data also over a desired period of time and, upon the next request, then to transmit it all. Thereby, the option is available for transmitting measured value curves, without having to separately transmit every single measured value.

As already mentioned, in the case of data transmission via different transmission networks, the time behavior of the data transmission must be taken into consideration. In the transparent transmission of protocols, timing problems can arise. Many bus protocols, such as e.g. the HART protocol, require that certain timing conditions be obeyed. These conditions can frequently not be met in the case of data transmission via radio networks having relatively low data transmission rates. Thus, the time interval between two packets of a transmission must not exceed a certain value.

In the case of fieldbus systems, data are packaged in special frames, before they are transmitted. The construction and length of these frames depend on the particular fieldbus system. For radio transmission, the frames must be split and then appropriately re-assembled at the receiver. Only when all radio modules participating in a network understand the appropriate protocols, can data be transmitted simply and error free between the superordinated unit and the field devices.

Radio modules RM and remote transmission units G can also be designed for different protocols. The protocols can be automatically recognized on the basis of their unique characteristics.

Each radio module in a radio network possesses a unique radio address, via which it can be spoken to. In the case of fieldbus systems, the participants are likewise identified via unique bus addresses. Unique Identifiers. The remote transmission unit G must assign to the respective bus addresses the associated radio addresses. Only in this way can the data be forwarded from the remote transmission unit G to the correct field device.

There are protocols which are specially provided for point-to-point connections. In the case of such applications, multiplexer, e.g. Hart-multiplexers, are utilized, in order to be able to make wired access to a plurality of field devices. Analogously, in the case of systems, which build on point-to-point connections, a radio-multiplexer can be utilized, which assumes the task of a conventional multiplexer and forwards the data to the appropriate field devices.

The invention claimed is:

1. A radio module for retrofitting a conventional automation field device that lacks a wireless technology for to include the radio module to provide wireless technology, comprising:
   a field device interface provided on the field device where the radio module is detachably connected to sensor electronics of the field device via said field device interface, or via a digital switching output;
   a microcontroller for function control;
   a radio unit for data communication with a superordinated unit;
   an energy supply unit having a limited capacitance; and
   an energy control unit, wherein:
   the data communication between the field device and the superordinated unit takes place using the radio unit, using a logging method which possesses the ability to record measurement data over a desired period of time and, upon the next request, then to transmit it all;
   the radio module is a single source for providing energy to the field device;
   said energy control unit controls the energy supply of the individual components of the radio module as well as to the field device in such a way the energy consumption of the field device and the radio module is as low as possible; and
   the radio module is designed in such a way that it transparently forwards the communication protocol.

2. The radio module as claimed in claim 1, wherein:
   energy transmission to and data communication with the field device occurs via a common connection.

3. The radio module as claimed in claim 1, wherein:
   energy transmission to and data communication with the field device occurs over separate connections.

4. The radio module as claimed in claim 1, wherein:
   status and configurable limit values of the field device are monitored and independently reported via its standard interface.

5. The radio module as claimed in claim 1, wherein:
   the radio module enables an essentially transparent transmission of a bus protocol via a utilized radio protocol (tunneling) and, in doing so, takes into consideration especially also specific timing requirements of the transmitted bus protocol.

6. The radio module as claimed in claim 1, wherein:
   the radio module automatically recognizes a fieldbus protocol and adjusts itself correspondingly to communicate meeting the specific requirements of the recognized fieldbus protocol.

7. A radio module for retrofitting a conventional automation field device that lacks a wireless technology to include the radio module to provide wireless technology, comprising:
   a field device interface provided on the field device where the radio module is detachably connected to sensor electronics of the field device via said field device interface, or via a digital switching output;
   a microcontroller for function control;
   a radio unit for data communication with a superordinated unit;
   an energy supply unit having a limited capacitance; and
   an energy control unit, wherein:
   the data communication between the field device and the superordinated unit takes place using the radio unit, using an event mode method, according to which data from the field device are stored temporarily in the radio module and transmitted at certain times to the superordinated unit;

the radio module is the single source for providing energy to the field device;

said energy control unit controls the energy supply of the individual components of the radio module as well as to the field device in such a way the energy consumption of the field device and the radio module is as low as possible; and the radio module is designed in such a way that it transparently forwards the communication protocol.

8. The radio module as claimed in claim 7, wherein: energy transmission to and data communication with the field device occurs via a common connection.

9. The radio module as claimed in claim 7, wherein: energy transmission to and data communication with the field device occurs over separate connections.

10. The radio module as claimed in claim 7, wherein: status and configurable limit values of the field device are monitored and independently reported via its standard interface.

11. The radio module as claimed in claim 7, wherein: the radio module enables an essentially transparent transmission of a bus protocol via a utilized radio protocol (tunneling) and, in doing so, takes into consideration especially also specific timing requirements of the transmitted bus protocol.

12. The radio module as claimed in claim 7, wherein: the radio module automatically recognizes a fieldbus protocol and adjusts itself correspondingly to communicate meeting the specific requirements of the recognized fieldbus protocol.

13. A radio module for retrofitting a conventional automation field device that lacks a wireless technology for to include the radio module to provide wireless technology, comprising:

a plurality of field devices;

an equal plurality of radio connections connected to a respective one of said field devices; and a gateway connected directly or remotely to said radio connections, each field device has:

a microcontroller for function control; a radio unit for data communication with a superordinated unit;

an energy supply unit having a limited capacitance; and an energy control unit, wherein:

the radio unit is a single source for providing energy to said field device and is capable of operating at least one polling mode, wherein if data for the field device is received by the radio module, a corresponding signal is transmitted to the field device, which ends the sleep state and enables a data communication between the radio module and the field device, the schedule transmission mode, wherein a field device and the radio module are activated at certain times and during this time measured values can be registered and data transferred, and an event mode, wherein data from the field device is stored temporarily in the radio module and transmitted at certain times; and said energy control unit controls the energy supply of the individual components of the radio unit as well as to said field devices in such a way that the energy consumption of said field devices and the radio module is as low as possible.

14. The radio module as claimed in claim 13, wherein: energy transmission to and data communication with the field device occurs via a common connection.

15. The radio module as claimed in claim 13, wherein: energy transmission to and data communication with the field device occurs over separate connections.

16. The radio module as claimed in claim 13, wherein: status and configurable limit values of the field device are monitored and independently reported via its standard interface.

17. The radio module as claimed in claim 13, wherein: the radio module enables an essentially transparent transmission of a bus protocol via a utilized radio protocol (tunneling) and, in doing so, takes into consideration especially also specific timing requirements of the transmitted bus protocol.

18. The radio module as claimed in claim 13, wherein: the radio module automatically recognizes a fieldbus protocol and adjusts itself correspondingly to communicate meeting the specific requirements of the recognized fieldbus protocol.

* * * * *